United States Patent
De Jong et al.

(10) Patent No.: US 10,375,805 B2
(45) Date of Patent: Aug. 6, 2019

(54) WIRELESS SWITCH

(71) Applicant: PHILIPS LIGHTING HOLDING B.V., Eindhoven (NL)

(72) Inventors: Lambertus Andrianus Marinus De Jong, Son (NL); Evert Schaeffer, Eindhoven (NL); Peter Deixler, Valkenswaard (NL); Wouter Lambertus Petrus Willaert, Eindhoven (NL); Richard Hoogenstraaten, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/350,068

(22) PCT Filed: Dec. 9, 2017

(86) PCT No.: PCT/EP2017/052811
§ 371 (c)(1),
(2) Date: Aug. 20, 2018

(87) PCT Pub. No.: WO2017/140565
PCT Pub. Date: Aug. 24, 2017

(65) Prior Publication Data
US 2019/0141824 A1    May 9, 2019

(30) Foreign Application Priority Data

Feb. 19, 2016 (EP) ..................... 16156416

(51) Int. Cl.
G06F 3/044    (2006.01)
H04L 12/28    (2006.01)
H05B 37/02    (2006.01)

(52) U.S. Cl.
CPC ..... *H05B 37/0272* (2013.01); *H04L 12/2816* (2013.01); *G06F 3/044* (2013.01); *H04L 2012/2841* (2013.01)

(58) Field of Classification Search
CPC .............. H05B 33/0884; H05B 33/089; H05B 37/0263; H05B 37/029; H05B 33/0815; H05B 37/03; H05B 33/08
(Continued)

(56) References Cited

U.S. PATENT DOCUMENTS 5,458,311 A     10/1995  Holbrook
2004/0206609 A1 10/2004  Tilley
(Continued)

FOREIGN PATENT DOCUMENTS

DE    102004047114 A1    5/2005
EP        1524750 A2     4/2005

*Primary Examiner* — Wei (Victor) Chan

(57) ABSTRACT

A wired switch allows switching the power supplied to a wirelessly controllable appliance, such as a lamp, which may be controlled by e.g. a smart phone running an app. A wireless switch is retrofitted to the wired switch. The wireless switch comprises one or more sensors arranged to detect both the position of the wired switch and a touch input. A controller, receiving indications based on said detection, determines a reachability of the wirelessly controllable appliance. The controller then associates an OFF command to the area of the wired switch that would normally be pressed to turn the lamp off. This allows the lamp to be turned OFF, when the wired switch is in the ON position, by a user controlling the wired switch as (s)he normally would without the used needing to actually change the position of the wired switch (thereby turning OFF power to the appliance).

15 Claims, 4 Drawing Sheets

(58) Field of Classification Search
USPC .......................... 315/97, 153, 155, 307, 362
See application file for complete search history.

(56) References Cited

U.S. PATENT DOCUMENTS

| | | |
|---|---|---|
| 2009/0231167 A1 | 9/2009 | Chen |
| 2011/0199004 A1* | 8/2011 | Henig ................ H05B 37/0218 |
| | | 315/152 |
| 2014/0262713 A1 | 9/2014 | Kudla |
| 2015/0043194 A1 | 2/2015 | Busby et al. |
| 2015/0077021 A1 | 3/2015 | Smith et al. |

* cited by examiner

WIRELESS SWITCH

CROSS-REFERENCE TO PRIOR APPLICATIONS

This application is the U.S. National Phase application under 35 U.S.C. § 371 of International Application No. PCT/EP2017/052811, filed on Feb. 9, 2017, which claims the benefit of European Patent Application No 16156416.6, filed on Feb. 19, 2016. These applications are hereby incorporated by reference herein.

TECHNICAL FIELD

The present disclosure relates to control equipment comprising a wireless switch and a controller for use in a system further comprising a wired switch, to which the wireless switch is retrofitted, for powering a wirelessly controllable appliance. The disclosure further relates to such a system, to a method of controlling a wirelessly controllable appliance and to a computer program product for performing the method.

BACKGROUND

"Connected lighting" refers to a system of luminaires which are remotely controlled via a communication protocol, usually over a wireless communication channel such as a channel of a wireless network. Typically, each of a plurality of luminaires, or even each individual lamps within a luminaire, may be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol). For instance the lighting control device may take the form of a user terminal, e.g. a portable user terminal such as a smartphone, tablet, laptop or smart watch; or a static user terminal such as a desktop computer or wireless wall-panel. In such cases the lighting control commands may originate from a lighting control application ("app") running on the user terminal, based on user inputs provided to the application by the user through a user interface of the user terminal (e.g. a touch screen or point-and-click interface). The user device may send the lighting control commands to the luminaires directly, or via one or more intermediate devices such as a wireless router, access point or lighting bridge.

A "connected" arrangement can also be used to control other appliances such as heating, ventilation, air conditioning, alarms (e.g. smoke alarms or CO detectors), sensors (e.g. security cameras or presence sensors), etc.

When an existing, traditional wired installation is upgraded to a wireless connected system, often there is the need to offer switching functionality for the new wireless system at the same location as the old system—i.e. the user expects to find the switches at the same location within the room (or more generally environment). However significant effort and cost are typically involved in replacing the wired switches with wireless switches.

DE102004047114 discloses a wireless module that retrofits onto a traditional wired rocker switch by means of a double-sided adhesive tape. The switch may be a light switch or other household switch. To fit the module, the user peels away a protective film on the underside of the tape and then uses the exposed adhesive of the tape to stick the wireless module to the front surface of the rocker. The module comprises an accelerometer and a wireless transmitter. When the rocker switch is pressed by a user a wireless signal is transmitted to a wireless receiver. The wireless module is powered independently by means of a small battery.

SUMMARY

There is a problem with DE102004047114 in that in order to infer the ON/OFF status of the electrical connection controlled by the switch, it has to be assumed that the switch is orientated in a standard manner, such that it can be assumed that an accelerometer reading indicating motion in one direction can be taken to mean switching ON, and an accelerometer reading indicating motion in the opposite direction can be taken to mean switching OFF. That is, going by UK standards, it must simply be assumed that when the top of the rocker is depressed this maps to the ON state, and when the bottom of the rocker is depressed then this maps to the off state.

However, switches are not always installed with a standard orientation. And/or, if there is more than one switch included in the same circuit, then sometimes the mapping of the ON/OFF state to the physical orientation for a given one of the switches can become reversed. It would therefore be advantageous to provide a system that did not rely on an assumption about the orientation of the underlying switch.

Similar considerations may apply in relation to situations where other sensors are used to detect the switching. E.g. if a touch sensor is placed on each side of the rocker, this can detect which side of the rocker the user has pressed, but without further measures being taken then one cannot know which side corresponds to ON and which OFF without making an assumption about the orientation of the switch.

According to a first aspect disclosed herein, there is provided control equipment for use in a system, the system comprising a wirelessly controllable appliance, and a wired switch connected into a wired electrical circuit for supplying power from a power source to the wirelessly controllable appliance, the wired switch arranged to be switched from a first position to a second position by a user exerting mechanical force on a first area of the wired switch, and from the second position to the first position by the user exerting mechanical force on a second area of the wired switch, wherein one of the first position and the second position of the wired switch is an ON state in which the power is supplied from the power source to the wirelessly controllable appliance via the electrical circuit, and the other of the first position and the second position of the wired switch is an OFF state in which no power is supplied to the wirelessly controllable appliance via the electrical circuit. The control equipment comprising:

a wireless switch arranged to be retrofitted to the wired switch, the wireless switch comprising one or more sensors, the one or more sensors arranged to detect whether the wired switch is in the first position or the second position and the one or more sensors further arranged to detect a touch input in at least a part of the first area of the wired switch and the one or more sensors further arranged to detect a touch input in at least a part of the second area of the wired switch, the wireless switch further comprising transmission circuitry (24) arranged to transmit an indication of said detections, and a controller (8, 16) arranged to wirelessly control the wirelessly controllable appliance via a wireless communication channel, to receive the indication, and to determine a reachability of the wirelessly controllable appliance over the wireless communication channel,
wherein the controller is further arranged to associate, based on the determined reachability of the wirelessly controllable appliance, one of the first area and the second area to an OFF command for turning OFF the wirelessly controllable appliance (4a), such that the one area is the same area of the first and second area which, when pressure is exerted on it, causes the wired switch to be switched to the position of the first and second position associated with the OFF state, and wherein the controller is further arranged for controlling the wirelessly controllable appliance, at least when the wired switch is in the ON state, to turn OFF when an indication is received of detection of a touch input in at least a part of the one of the first area and the second area associated with the OFF command.

A user wanting to switch a wirelessly controllable appliance, such as a lamp, OFF can do so using, for example, an app. However, it is convenient to be able to do the same using a switch. The wireless switch retrofitted to the wired wall switch allows the user to use the wireless switch to turn the lamp off. The user will normally be familiar with which side of the wired switch is ON and which side is OFF. This control paradigm carries over, in the control equipment according to the first aspect, to the wireless switch when retrofitted to the wired switch. In a rocker switch, as an example, if the user would switch it from UP to DOWN to turn a lamp OFF by exerting pressure on the TOP side, the rocker switch may remain in the ON position to power the wirelessly controllable appliance and touching the rocker switch on the TOP side causes an OFF command to be sent to the wirelessly controllable appliance (e.g. a lamp). Furthermore, if a user is unaware of the fact that the lamp is a wirelessly controllable appliance and tries to use the wall switch, the lamp will turn OFF when the user first touches the wall switch. The user will notice the lamp turning OFF and as such does not need to assert further mechanical pressure. Thus, the wired switch will remain in the ON mode such that it remains wirelessly controllable, for example, via the app.

In embodiments the wirelessly controllable appliance may be a first illumination source (lamp or luminaire) arranged to emit illumination to illuminate an environment when powered by said power source. In embodiments there may be one or more other appliances, such as further illumination sources arranged to emitting illumination to illuminate the environment. If multiple wirelessly controllable devices receive power via the same wired switch, then the reachability of the combined multiple wirelessly controllable device can be used for associating the ON and/or OFF commands to the first and second area. This can be beneficial to avoid other causes of unreachability of a wirelessly controllable device, such as network issues, determining the association.

In embodiments the controller may be a mobile user terminal such as a laptop, tablet, smartphone, smart watch, running an app or dedicated remote control device. Alternatively or additionally the controller may comprise a static terminal such as a desktop computer or wall panel. As a further alternative or additional possibility, the controller may comprise a dedicated control unit (e.g. a building controller or lighting bridge), or a server implemented in one or more server units at one or more geographic sites. The controller may also be implemented in any combination of one or more such possibilities. E.g. while in the case of a user terminal, the user terminal may comprise its own wireless transceiver for communicating with the wireless switch and luminaire, in the case of a server on the other hand, the controller may also comprise a user terminal and/or a suitable access point connecting to the server connecting to the wireless switch and luminaire.

In cases where the smart phone running an app comprises a general purpose computing device, such as a server, desktop computer, laptop computer, tablet, smart phone or smart watch, this device may be arranged to run a control application (or "app") configured to perform said control of the appliance. In cases where the controller comprises a dedicated device such as a dedicated remote control or building control unit, the control (including said functionality) may be implemented in hardware circuitry, or in software, or a combination of hardware and software.

The controller can may be a node in the system, for example, the system can be a networked lighting system and the controller is a bridge, hub, lighting device or actuator in the system. For example, the controller can be embedded in the wireless switch. The logic, i.e. the function implemented by the controller, may be implemented in the form of software stored in memory (comprising one or more memory media implemented in one or more memory units) and arranged so as when executed on processing apparatus (comprising one or more processing units) to perform the function of associating the ON and/or OFF command to the first and/or second area. Alternatively the state tracking logic may be implemented in dedicated hardware circuitry, or configurable or reconfigurable hardware circuitry such as a PGA or FPGA, or any combination of hardware and software.

In an embodiment of the control equipment according to the first aspect, the controller is further arranged to associate the other of the first area and the second area to an ON command for turning ON the wirelessly controllable appliance, and wherein the controller is further arranged for controlling the wirelessly controllable appliance, at least when the wired switch is in the ON state, to turn ON when an indication is received of detection of a touch input in at least a part of the other one of the first area and the second area associated with the ON command. The wirelessly controllable appliance comprised in the system may be a lighting device arranged to emit illumination to illuminate an environment, and wherein the controller is arranged to control the lighting device when the lighting device is powered by the power source. The controller may further be arranged to control one or more of: a degree of intensity of the light emitted by the lighting device, a color of the light emitted by the lighting device, and a lighting scene according to which the lighting device emits light. Advantageously, the area of the wired switch associated with the ON respectively OFF command can then for example be used to dim a lamp UP respectively DOWN, or a set of scenes can be scrolled to allowing selection of respectively a NEXT or PREVIOUS scene. The wireless switch may be able, in an embodiment, to detect various types of touch input, such as a single versus a double tap, or a tap versus a hold, or various levels of pressure exerted. These can be used for more advanced control features, such as, again, dim level control, color control, scene recall, etc.

In another embodiment of the control equipment according to the first aspect, the controller is further arranged to control one or more other wirelessly controllable appliances based on receiving an indication of detection of a touch input. Although the wired switch may only provide power to the wirelessly controllable appliance, the wired switch can be used to control further wirelessly controllable appliances. The controller receiving an indication of a detected touch input can then turn, for example, not only the wirelessly controllable appliance ON but also further wirelessly controllable appliances.

In further embodiments of the control equipment according to the first aspect, the controller is arranged to associate the one of the first area and the second area to an OFF command when it has received an indication of a detection of the wired switch changing from the first position to the second position or from the second position to the first position. Instead, the controller may be arranged to associate the one of the first area and the second area to an OFF command when it has determined a change in the reachability of the wirelessly controllable appliance over the wireless communication channel. As another option, the controller may be arranged to associate the one of the first area and the second area to an OFF command only when it has both determined a change in the reachability of the wirelessly controllable appliance over the wireless communication channel, and it has received an indication of a detection of the wired switch changing from the first position to the second position or from the second position to the first position. The same can be applied for the association of the ON command or other commands such as dim UP or dim DOWN.

In yet another embodiment of the control equipment according to the first aspect, the one or more sensors of the wireless switch comprise one or more of: an accelerometer, a touch sensor, a proximity sensor, and/or a vibration sensor. In various implementations of the wireless switch, a single sensor can measure multiple aspects (e.g. an accelerometer detecting an UP/DOWN position as well as a touch input) or multiple sensors may be used. The wireless switch may comprise a first part for at least partially overlapping the first area of the wired switch and a second part for at least partially overlapping the second area of the wireless switch, and wherein each of the first and the second part comprises a sensor for detecting a touch input (or a single sensor that can distinguish between a touch input in either part). The sensor for detecting the touch input may be a sensor for detecting a bodily object within a proximity of the sensor, such that the touch input is a near touch input. This is especially beneficial, as the chance of the user accidentally exercising a mechanical force onto the wired switch causing it to switch to the OFF position when the user wants to turn the wirelessly controllable appliance OFF decreases when the wirelessly controllable appliance turns OFF as soon as the user moves, for example, his/her finger close to the side of the switched that would be pressed to turn the wired switch to the OFF position.

According to a second aspect disclosed herein, there is provided a system comprising the control equipment according to the first aspect, the system further comprising the wired switch and/or the wirelessly controllable appliance (such as a lighting device).

According to a third aspect disclosed herein, there is provided a method of controlling a wirelessly controllable appliance through a controller comprised in a system, the system further comprising a wired switch retrofitted with a wireless switch, the wired switch connected into a wired electrical circuit for supplying power from a power source to the wirelessly controllable appliance, the wired switch arranged to be switched from a first position to a second position by a user exerting mechanical force on a first area of the wired switch, and from the second position to the first position by the user exerting mechanical force on a second area of the wired switch. One of the first position and the second position of the wired switch is an ON state in which the power is supplied from the power source to the wirelessly controllable appliance via the electrical circuit, and the other of the first position and the second position of the wired switch is an OFF state in which no power is supplied to the wirelessly controllable appliance via the electrical circuit. The method comprises: receiving, from the wireless switch, an indication whether the wired switch is in the first position or the second position (or, for example, if the controller is embedded in the wireless switch: detecting whether the wired switch is in the first position or the second position); receiving, from the wireless switch, an indication of detection of a touch input in at least a part of the first area of the wired switch or an indication of detection of a touch input in at least a part of the second area of the wired switch (or, for example, if the controller is embedded in the wireless switch: detecting a touch input in at least a part of the first area of the wired switch or an indication of detection of a touch input in at least a part of the second area of the wired switch); determining a reachability of the wirelessly controllable appliance over a wireless communication channel; associating, based on the determined reachability of the wirelessly controllable appliance, one of the first area and the second area to an OFF command for turning OFF the wirelessly controllable appliance, such that the one area is the same area of the first and second area which, when pressure is exerted on it, causes the wired switch to be switched to the position of the first and second position associated with the OFF state, and controlling the wirelessly controllable appliance, at least when the wired switch is in the ON state, to turn OFF when an indication is received of detection of a touch input in at least a part of the one of the first area and the second area associated with the OFF command (or, for example, if the controller is embedded in the wireless switch: to turn OFF when a touch input is detected in at least a part of the one of the first area and the second area associated with the OFF command switch).

In an embodiment of the method according to the third aspect, the method further comprises: associating the other one of the first area and the second area to an ON command for turning ON the wirelessly controllable appliance and controlling the wirelessly controllable appliance, at least when the wired switch is in the ON state, to turn ON when an indication is received of detection of a touch input in at least a part of the other one of the first area and the second area associated with the ON command (or, for example, if the controller is embedded in the wireless switch: to turn ON when a touch input is detected in at least a part of the other one of the first area and the second area associated with the ON command).

It shall be clear that the method claim is analogous to the device claim and that any of the features of the embodiments according to the first aspect can be applied to the method according to the third aspect.

According to a fourth aspect disclosed herein, there is provided a computer program product arranged for performing the method according to any one of the preceding claims when run on a computer device. Such a computer program product may be stored in a memory of a controller, such as a smart phone or a bridge, or embedded in a wireless switch. It may be made available for download to a smart phone.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
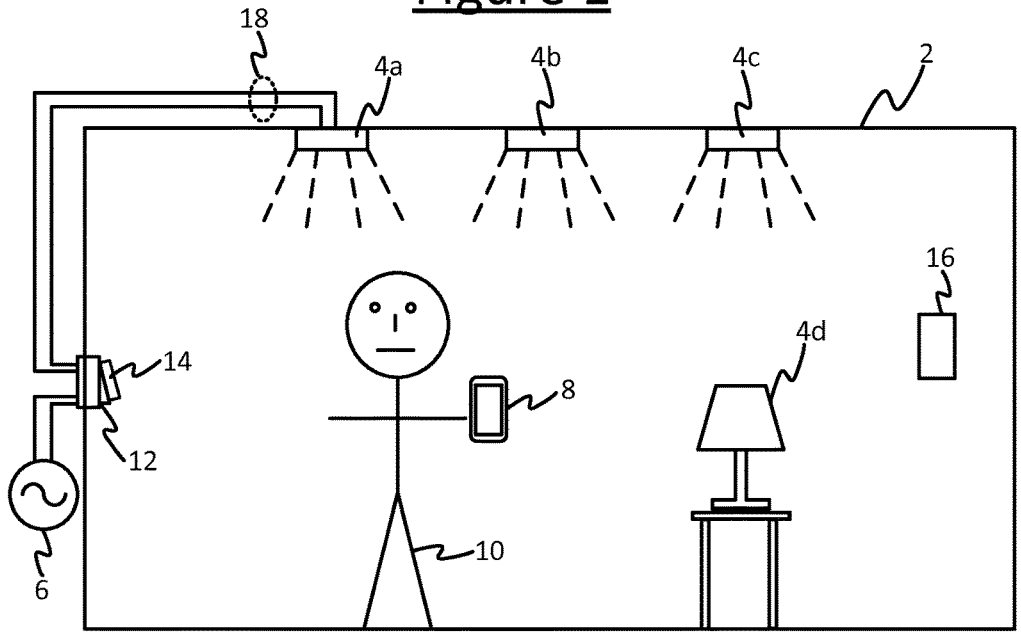
FIG. 1 is a schematic illustration of an environment illuminated by a lighting system.

Many existing lighting installations are typically based around "legacy" wall switches, i.e. traditional wired wall switches each connected to control the illumination from one or more luminaires by simply making and breaking a wired electrical circuit supplying power to the respective one or more luminaires. When an existing installation is adapted to a wireless connected lighting system, often there is the need to offer switching functionality for the new wireless system at the same location as in the old situation. However significant effort and cost are involved in replacing the wired switch. The following describes a wireless switch that can be simply attached to the front of the wired switch (or part thereof). This provides the extra functionality to wirelessly connect to the wireless lighting system, while leaving the existing wall switch in place. In embodiments, the new switch can also be designed to match the style and color of the wired switch. The attachment, setup and configuration of the wireless switch is simple and can be performed without knowledge of electrical installations.

Connected lighting systems are being installed and used more and more in recent years, whether in a residential context, in offices, or elsewhere. For example, the lights may be controlled by an app running on a smart device and/or by a physical remote control. Many users wish to also control their lights by wall switches with the same functionality as offered through the app or remote (e.g. grouping features, situation and time aware functionality, etc.). This is conventionally not possible and/or not available at attractive price levels. Wall switches that offer that functionality in the right style, shape, and/or color are mostly not available on the market, and if they are available they are expensive to purchase and install.

The location of the existing wall-based switches can offer any one or more several potential benefits, such as:

they have logical positions, e.g. next to the door where the user enters a room;

this position is expected and can easily found by guests, who may not have access to a smart device or know where to find the remote control device; and/or when carrying stuff, or with hands dirty or wet, it possible to operate a wall switch with one's elbow. In this case the other means (app or remote) are not possible or attractive.

The present disclosure provides a wireless switch that can be attached to an existing (legacy) wall switch. For example, a user simply peels of a protective sheet to expose a glue layer and attaches the wireless switch to the rocker of the existing wall switch. The wireless switch may be designed to have the same look and feel as the wired switch. It may fully or partially cover the wired switch.

The wireless switch comprises one or more sensors for determining its state (e.g. its position). For instance it may comprise a touch sensor to sense a user touching it, or an accelerometer to sense a user moving it. In addition, the wireless switch comprises transmission circuitry for transmitting an indication of the detection to a smart phone running an app such as a smartphone running a lighting control app, a bridge or hub in a networked lighting system, or the like. To power the circuitry for transmitting the sensor (and optionally the sensor itself, although in embodiments the sensor is a passive sensor), the wireless switch may be battery powered or may be configured to perform energy harvesting.

Thus there is provided a retrofittable wireless switch fitted onto a traditional, wired, mechanical light switch (wired switch), leaving the wired switch operable. The retrofittable wireless switch is suitable for controlling one or more networked lighting devices, at least one of which is powered via the wired switch. The retrofittable wireless switch has a sensor for determining the position of the wired switch, and a transmitter for transmitting an indication. The one or more networked lighting devices may also be controllable via a user interface of a smart phone running an app (e.g. smart phone).

The wireless switch can support various use cases. For instance, the wireless switch, when touched, can turn ON or OFF the connected lamps. Using detection of the position of the wired switch and reachability of the wirelessly controllable device, the ON and OFF commands can be mapped to the wired switch. Detection of the position of the wired switch may further be used for other purposes. For instance, consider a system where the user interface (UI) may be controlled by a user to control networked lamps A (powered via the wired switch) and, for some scenarios below, other lamps B (not powered via the wired switch). In such cases, any one, more or all of the following features may be implemented:

if the wired switch is in the OFF position, warn the user (e.g. exclamation mark in UI, mark a light as non-controllable in the UI, or such like);

if the wired switch is in the OFF position, do not send out commands to lamp A (e.g. if a rule is triggered that controls lamp A, for example based on a presence sensor);

if the wired switch is in the OFF position, amend the output of lamp B to accommodate for a scene lacking lamp A;

if the wired switch is initially in the OFF position, but is then turned ON, send out a control command to lamps A and B to restore the scene, if the wired switch is initially in the ON position, but is then turned to the OFF position, control lamp B to flash to warn the user; and/or if the wired switch it in the OFF position, but it is detected that the user touches the wireless switch trying to turn lamp A ON, flash lamp B to indicate to the user that (s)he must first turn the wired switch to the ON position.

System Overview

FIG. 1 schematically illustrates a system in accordance with embodiments disclosed herein. The system comprises one or more luminaires 4, a wired switch 12, a wireless switch 14, and a controller (such as a smart phone running an app 8 or a lighting bridge 16). The luminaires 4 are arranged to illuminate an environment 2, e.g. an interior space such as room of a building or the interior of a marquee, or an outdoor space such as a garden or park, or a partially covered space such as gazebo, or the interior of a vehicle such as s train or ship. Each of the luminaires 4 comprises a respective one or more lamps (illumination elements), plus any associated socket, support and/or housing. A term that may be used to refer to either a luminaire or an individual lamp is an "illumination source". Four luminaires 4a, 4b, 4c, 4d are shown in FIG. 1 by way of illustration, but it will be appreciated that the system may comprise other numbers of luminaires 4. Each luminaire 4 may take any of a number of forms, such as a luminaire mounted on the ceiling, a wall washer, task lighting (e.g. kitchen task lighting), a luminaire embedded in an item of furniture, or a free-standing luminaire (commonly referred to in everyday parlance as a "lamp", in contradiction to the technical definition of a lamp). Note also that in the case of multiple luminaires 4, these need not necessarily take the same form as one another.

At least a first of the luminaires 4a is connected to a power source 6 via an electrical circuit 18, in order to supply power to the luminaire 4a to enable it to emit its respective illumination. The power source 6 may be an AC power source such as a mains connection, or a building generator. Alternatively the power source 6 may be a DC power source such as a battery.

The electrical circuit 18 includes the wired switch 12, which alternately makes and breaks the electrical circuit 18 when mechanically actuated (e.g. pressed) by a user, thereby turning on and off the power to the luminaire 4a respectively. In the illustrated embodiment the switch 12 is a wall switch mounted on the wall of a room, but in alternative embodiments it could instead be mounted elsewhere such as the surface of an item of furniture, or on a household fixture such as a kitchen cabinet, or attached to the housing or lead of a lampstand in the case where the luminaire 4 is a free-standing luminaire.

The wired switch 12 may employ any of a variety of switching mechanisms. For example, the wired switch 12 may take the form of a rocker switch comprising a rocker arranged to be rocked back and forth between two positions, or a toggle switch comprising a toggle arm arranged to be toggled back and forth between two positions. When the user presses the rocker or toggle arm into one of the two positions, the ON position, the circuit 18 is made such that the luminaire 4a is connected to the power source 6 and thereby powered; and when the user presses the rocker or toggle arm into the other of the two positions, i.e. the OFF position, the circuit 18 is broken such that the luminaire 4a is disconnected from the power source 6 and thereby disconnected.

Somewhat similarly, the wired switch 12 could instead take the form of a toggle switch, in which case similar comments apply in relation to the toggle arm of the toggle switch.

As another example, the wired switch 12 may take the form of a rotary switch (e.g. dimmer switch) comprising a rotary element (e.g. knob) arranged to be rotated by the user between an OFF position and an ON position (and optionally, in the ON position the angle of rotation may be variable over a further range in order to dim the illumination from the luminaire 4a). Again in the ON position the switch 12 connects the circuit so as to supply power to the luminaire 4a from the power source 6, and in the OFF position the switch 12 disconnects the circuit so as not to supply power to the luminaire 4a from the power source 6.

Note that the form of the electrical circuit 18 shown in FIG. 1 only for schematic purposes, and does not necessarily represent the actual wiring that need be used (though this is one possibility). E.g. in another possibility, there could be another switch (not shown) also connected into the same circuit 18, arranged such that when either switch is pressed the light is alternated from its present state (powered or not powered) to the other state (not powered or powered respectively). In embodiments this has the effect of reversing the state (ON or OFF) of the other switch in the circuit 18 without that switch being physically actuated. Alternatively the switches could be arranged such that the state of the other switch is not affected, such that turning off either switch breaks the circuit 18, and both switches need to be ON in order to make the circuit. A skilled person will be familiar with suitable wiring techniques for connecting a luminaire 4a to a power source 6 such as the mains via a wired switch 12.

As mentioned, the system further comprises a controller such as a smart phone running an app 8, for controlling the illumination emitted by at least the first luminaire 4a, and in embodiments also controlling the illumination of one or more others of the luminaires 4b, 4c, 4d. This control may comprise turning the illumination on and off, dimming the brightness (dim level) of the illumination, and/or changing the color of the emitted illumination. To do this, the controller is configured to transmit (directly or indirectly, e.g. via a bridge, hub or other device) a control command over a wireless communication channel to the luminaire 4a or luminaires 4 in question, wherein the control command comprises a signal indicating the relevant change to be made to the illumination (on/off, dim up/down, or color change). The wireless control channel between the controller 8, 16 and any given luminaire 4 may be implemented in any of a number of ways. For instance, in embodiments the smart phone running an app 8 and the luminaire 4 may be configured to operate according to the same wireless access technology, e.g. both Wi-Fi, both Bluetooth or both ZigBee. In this case the channel may be established directly between the smart phone running an app 8 and the luminaire 4, or at least only via an intermediate node such as a router (not shown) that operates based on the same access technology.

Alternatively, the smart phone running an app 8 may be configured to operate based on a different wireless access technology than the luminaire 4. In this case the wireless channel is established via a bridge 16, which in the case of a lighting system may be referred to as a lighting bridge. The smart phone running an app 8 sends the lighting control commands to the bridge 16 using a first wireless access technology, and the bridge forwards the lighting control commands to the luminaire 4 using a second wireless access technology. For example, the first wireless access technology may be Wi-Fi or Bluetooth, while the second access technology may be a ZigBee technology. A wireless access technology herein refers to a wireless communication protocol plus the necessary capability to transmit and/or receive on a suitable medium over a suitable frequency range and for the technology in question (e.g. a certain RF band or bands). Similarly, the wireless switch may connect with the bridge 16 when the bridge 16 is the controller.

In the case of controlling multiple luminaires 4, the same channel or type of channel need not necessarily be used between the controller 8, 16 and each of the different luminaires 4, though in embodiments in could be. Further, in the case of controlling multiple luminaires 4, the controller 8, 16 may control them individually or in groups. For instance in embodiments the smart phone running an app may establish a separate wireless connection with each of the luminaires 4 and control each of them individually via the respective channel. In other embodiments the controller

8, 16 may establish a common connection with an intermediate centralized node, and then address individual commands to different ones of the luminaries 4 to be forwarded accordingly. As another possibility, the smart phone running an app 8 may establish a common connection with the bridge 16 and send lighting control commands to each of one or more group addresses, each corresponding to a group of the luminaires 4 being a subset of the total set of luminaires 4 which the smart phone running an app 8 can control. Again, the bridge 16 or intermediate node then forwards the commands to the relevant group.

In embodiments the controller may comprise an automated control unit such as a buildings controller or dedicated lighting controller, e.g. which automatically makes changes to the emitted illumination based on the level of ambient light sensed by an ambient light sensor (not shown), or perhaps based on a timer. The controller could be implemented instead in the form of a dedicated unit installed in the environment 2, or as a server plus a suitable wireless access point for establishing the wireless connection with the luminaire 4, bridge 16 or router. In the latter case the server need not necessarily be physically present in the environment 2, though it could be.

Alternatively, in embodiments instead of a smart phone running an app 8, a user terminal such as a desktop computer, laptop computer, tablet, smartphone or smart watch may be used. The user terminal 8 is operated by a user 10, who may or may not be the same user who actuates the wired switch 12. The user terminal 8 itself may or may not be physically present in the environment 2; though in some embodiments, especially in the case of a mobile user terminal, a policy may be enforced that the terminal 8 has to be physically present in the environment 2, or at least with the exception of certain users (e.g. with administrator status). Such policies can be applied by means of a suitable localization system and optionally authentication system, these techniques being known in the art and therefore not discussed in more detail here.

The user terminal may comprise a user interface allowing the user 10 to instigate the sending of the lighting control commands over the wireless channel(s) to the luminaire(s) 4, in order to implement desired illumination output from the luminaire(s) 4. For instance, the user interface may present the user 10 with a control (e.g. an on-screen button) enabling the user to switch the illumination from a particular luminaire 4a or group of luminaires 3 on and off; and/or may present the user 10 with a control (e.g. an on screen slider or dial) enabling the user to dim the illumination up and down; and/or may present the user 10 with a control (e.g. a set of sliders or dials, or a palette) enabling the user to select a color of the illumination emitted by a particular luminaire 4a or group of luminaires 4. The user terminal 8 then formulates the corresponding lighting control command and sends it wirelessly to the appropriate luminaire(s) 4 over the wireless channel(s).

As another example, the smart phone running an app 8 may alternatively or additionally be configured to facilitate the creation of a lighting scene. For instance, the smart phone running an app 8 may be operable to receive a still or moving image, such as a digital photograph, drawing, video or animation (typically selected by the user) and to generate a lighting scene based on the image by picking colours and/or intensities from different points or regions in the image and reproducing these in the colours and/or dim levels of different respective ones of the luminaires 4 at different corresponding locations in the environment 2. In this way for example, if a user 10 selects an image of a forest, the environment 2 can be illuminated with colours and shades that give the feel of being in a forest. Alternatively or additionally, the smart phone running an app 8 may enable the user 10 to design the lighting scene him or herself, such as by placing (e.g. dragging and dropping) lighting effects onto a graphical representation (e.g. photo) or simulation (e.g. 3D model) of the environment 2. Either way, whether the scene is generated from an image or designed by the user 10, the smart phone running an app 8 formulates the corresponding lighting control command and sends them wirelessly to the respective luminaires 4 over the wireless channel(s) in order to implement the scene.

In embodiments, any or all of the various functionality of the controller 8, 16 described above (or elsewhere herein) may be implemented in the form of software run on the smart phone running an app 8, e.g. a lighting control app. Or a professional lighting control software in case a buildings controller is used instead of a smart phone. Or embedded software in the case a dedicated control unit is used instead of a smart phone. Alternatively, some or all of any of the functionality of the controller 8, 16 described above (or elsewhere herein) may be implemented in the form of dedicated hardware circuitry, or configurable or reconfigurable hardware circuitry such as a PGA (programmable gate array) or FPGA (field programmable gate array), or any combination of hardware and software.

Note also that the controller 8, 16 may comprise a combination of devices. For example, the controller 8, 16 may be implemented in the form of a server and user terminal, e.g. mobile user terminal. In this case the user terminal connects to the server via at least one network, e.g. the Internet and/or a local wired or wireless network, while the user terminal connects wirelessly to the wireless switch 12 and luminaire 4a. This way, the server can implement the described control functionality via the user terminal, and/or the user terminal can implement the described control functionality using the server for support. E.g. the user terminal may provide the user interface whilst the server hosts the app and/or provides the state tracking functionality for the wired switch 12 (to be discussed in more detail later).

By whatever means the controller, such as the smart phone running an app 8 or the bridge 16 is implemented, its ability to control the illumination emitted by the first luminaire 4a depends on whether power is being supplied to the first luminaire 4a, and therefore on the state of the wired switch 12. When the power is turned on, the smart phone running an app 8 or the bridge 16 is able to control the illumination emitted by the luminaire 4a, and when the power is off, the smart phone running an app 8 or the bridge 16 is not able to control the illumination emitted by the luminaire 4a due to the fact of it not being powered and therefore is unable to emit illumination regardless of any command from the smart phone running an app 8 or the bridge 16.

Therefore to enable the smart phone running an app 8 or the bridge 16 to determine whether or not it does indeed have control of the first luminaire 4a, the wired switch 12 is retrofitted with a wireless switch 14. The wireless switch 14 is arranged to detect the change in state of the wired switch 12, e.g. when the wired switch 12 is mechanically actuated, and to transmit an indication of this to the controller 8, 16.

Note that one, some or all others of the luminaires 4b, 4c, 4d could be arranged in a similar manner to the first luminaire 4a. Each may be connected to the same power source 6 as the or first luminaire 4a, or to a different respective power source of its own. Each may be connected on its own respective circuit so as to have its power switched by its own wired switch, or could be connected into the same circuit 18 as the first switch and be switched by the same wired switch 12. Where the other lamps, 4b, 4c, 4d have switches different than the wired switch 12 of the first lamp, one, some or all of these other switches could be fitted with their own instance of wireless switch, or alternatively may not be. Various aspects in the present disclosure may be described in relation to the first luminaire 4a and its respective, circuit 18, power source 6 and wired switch 12, but it will be appreciated that similar teachings can apply in relation to any of the luminaires 4 and their responsive circuit, power sources and switches (not shown).

Figure 2:
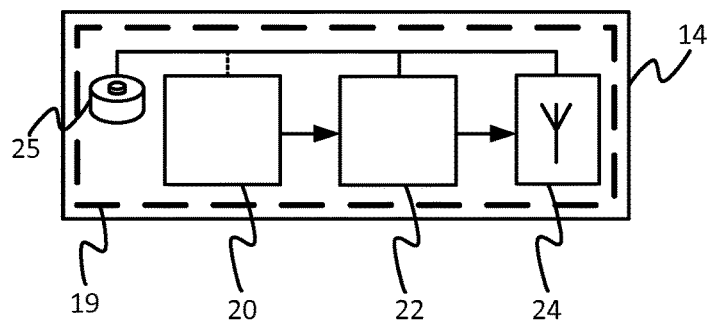
FIG. 2 is a schematic block diagram of a retrofittable wireless switch.

FIG. 2 gives a schematic block diagram of a wireless switch 14 for fitting to the wired switch 12. The wireless switch 14 comprises at least one wireless detector module 19, this module 19 comprising one or more sensors 20, a local switch control logic 22, and a wireless transmitter 24. Preferably the detector module 19 also comprises a local power source 25 independent of the wired electrical circuit 18 and power source 6. The local power source 25 is connected to power at least the wireless transmitter 24 and any associated control logic 22. In embodiments the one or more sensors 20 are passive sensors that do not require powering, though alternatively it is not excluded that they may comprise one or more active sensors that are powered by the local power source 25.

The one or more sensors 20 are arranged to detect the position of the wired switch 12, to which the wireless switch 14 is attached. There are a number of options for the one or more sensors 20. For example, the one or more sensors 20 may comprise one or more accelerometers mechanically coupled to the moving part of the wired switch 12 (e.g. rocker, toggle arm or rotary element), so as to move when the moving part moves. This then generates a sensor reading due to the acceleration comprised by the movement, which gives an indication that the wired switch 12 has been mechanically actuated and the position can be determined based on this.

Whatever form the wired switch 12 takes and whatever sensor means are used to detect its position, the wired switch 12 transmits an indication of this to the controller 8 (e.g. using any suitable wireless communication protocol such as Wi-Fi, Bluetooth or ZigBee, or e.g. over a bus if the controller is part of the wireless switch).

The local power source 25 may take a number of forms such as a small battery, or an energy harvesting device such as a light transducer arranged to harvest energy from ambient light in the environment 2, or a kinetic energy harvesting device configured to harvest kinetic energy from the motion of the moving part of the wired switch 12. Note also that the less-preferred alternative of powering the wireless switch 14 from the wired circuit 18 is not excluded. Whatever means is used, the energy from the battery, or the harvested energy, or energy from the circuit 18, or a combination of any one or more of these, may then be used to power the wireless switch 14, i.e. to power at least the wireless transmitter 14, and any control logic 22, and optionally (if active) the one or more sensors 20.

The local switch control logic 22 may be implemented in the form of code stored on a memory of the wireless switch 14 and arranged to run on a processing apparatus of the wireless switch 14 (the memory comprising one or more storage media implemented in one or more memory units, and the processing apparatus comprising one or more processing units). Alternatively the local switch control logic 22 may be implemented in dedicated hardware circuitry, or configurable or reconfigurable hardware circuitry such as a PGA or FPGA, or any combination of hardware and software.

Figure 3:
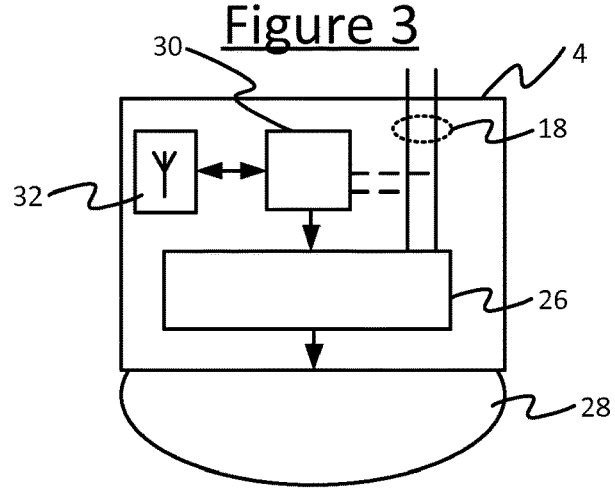
FIG. 3 is a schematic block diagram of a wirelessly controllable luminaire.

FIG. 3 gives a schematic block diagram of a luminaire 4. At least the first luminaire 4a is configured in accordance with FIG. 3, and in embodiments any one, more or all of the other luminaries 4 may also be configured in accordance with FIG. 3. The luminaire 4a comprises one or more lamps 28, and a driver 26 connected to the one or more lamps 28 and to the electrical circuit 18. The luminaire 4a further comprises a wireless receiver (or transceiver) 32, and local luminaire control logic 30 coupled to both the wireless receiver 32 and the driver 26.

The electrical circuit 18, to which the driver 26 is connected, is that which is controlled by the wired switch 12. The driver 26 is arranged so that when the wired switch 12 is in the ON state, the driver 26 is able to deliver power to the one or more lamps 28 so as to cause it/them to emit illumination. The local luminaire control logic 30 is arranged to receive one or more lighting control commands from the controller, such as a smart phone running an app 8 or a bridge 16 via the wireless receiver 21 (using any suitable wireless communication protocol such as Wi-Fi, Bluetooth or ZigBee), and in response to control the driver 26 in order to control the illumination emitted by the one or more lamps 28 in accordance with the one or more lighting control commands.

For instance, if one of the received lighting control commands specifies the illumination is to be turned on or off, the local luminaire control logic 30 controls the driver 26 to either supply the power from the electrical circuit 18 to the lamp(s) 28 or not, respectively. Or if one of the received lighting control commands specifies the illumination is to be dimmed up or down, the local luminaire control logic 30 controls the driver 26 to increase or decrease, respectively, the power delivered from the electrical circuit 18 to the lamp(s) 28. Or if one of the received lighting control commands specifies the illumination is to change color, the local luminaire control logic 30 controls the driver 26 to change the color of the illumination emitted from the lamp(s) 28 (e.g. by changing the combination and/or emitted-power-ratio of differently colored elements such as differently colored LEDs in one or more of the lamps 28).

However, when the wired switch 12 is in the OFF state, such that no power is delivered to the driver 26 and therefore to the one or more lamps 28, this means no illumination can be emitted by the one or more luminaires regardless of the lighting control commands, and so the local luminaire control logic 30 is unable to control any such emission.

In embodiments, the local luminaire control logic 30 and/or the luminaire's wireless receiver (or transceiver) 32 may be powered by the same power source 6 and electrical circuit 18 as the driver 26. In this case when the wired switch turns the power to the luminaire 4 off, the luminaire 4 cannot communicate with the controller 8, 16. But even if the luminaire control logic 30 and receiver/transceiver 32 are powered from a different power source that remains on, they still cannot act on any lighting control commands from the controller 8, 16 because the driver 26 is still off.

The local luminaire control logic 30 may be implemented in the form of code stored on a memory of the luminaire 4 and arranged to run on a processing apparatus of the luminaire 4 (the memory comprising one or more storage media implemented in one or more memory units, and the processing apparatus comprising one or more processing units). Alternatively the local luminaire control logic 22 may be implemented in dedicated hardware circuitry, or configurable or reconfigurable hardware circuitry such as a PGA or FPGA, or any combination of hardware and software.

Figure 4:
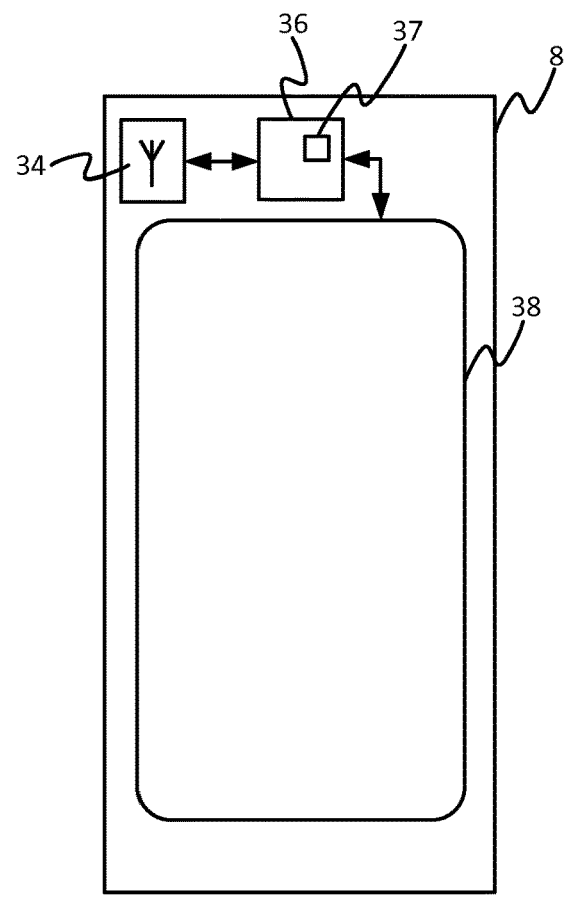
FIG. 4 is a schematic block diagram of smart phone running an app.

FIG. 4 gives a schematic illustration of a smart phone running an app 8 in accordance with embodiments disclosed herein. The smart phone running an app comprises a wireless transceiver 34, optionally a user interface 38, and a controller 8, 16 coupled to both the user interface 38 and wireless transceiver 34. The lighting controller 8, 16 is configured to generate the lighting control commands, which may be destined for the first luminaire 4a and/or any one, some or all of the other luminaires 4, and to transmit these to the respective destination luminaire(s) 4 via the wireless transceiver 34 (using any suitable wireless communication protocol such as Wi-Fi, Bluetooth or ZigBee).

In embodiments, one, some or all of the lighting control commands may be generated based on an input from the user 10 inputted through the user interface 38. For example, the user interface 38 may comprise a touch screen, and/or a screen plus pointing device (such as a mouse or trackpad) configured to provide a point-and-click and/or drag-and-drop type interface. E.g. in embodiments the user interface 38 may be used to present the user with an on-screen button enabling the user 10 to turn the illumination from a given luminaire 4 on and off, and/or an on-screen slider or dial enabling the user 10 to dim the illumination up or down, and/or a control such as an on-screen palette or set of sliders or dials enabling the user to set a color of the illumination. As another alternative or additional example, the user interface 38 may present the user with an on-screen interface for designing a lighting scene, or selecting an image from which the scene is automatically generated, as discussed above.

The controller function may be implemented in the form of a processor 36 with code stored in a memory 37 on a smart phone 8 or bridge 16 (the memory comprising one or more storage media implemented in one or more memory units, and the processing apparatus comprising one or more processing units). Alternatively the controller function may be implemented in dedicated hardware circuitry, or configurable or reconfigurable hardware circuitry such as a PGA or FPGA, or any combination of hardware and software.

As mentioned, the controller 8, 16 may take the form of a single device or multiple devices. E.g. the controller 8, 16 could be implemented solely as an "app" running on a user terminal, preferably a mobile user terminal such as a laptop, tablet, smartphone or smart watch; or in software of a dedicated lighting control unit or buildings controller. Alternatively for example, the controller 8, 16 could be implemented as a combination of an app running on a user terminal (e.g. a mobile user terminal such as a laptop, tablet, smartphone or smart watch) plus settings stored on a server; or an app hosted on a server and run through a user terminal (e.g. again a mobile user terminal such as a laptop, tablet, smartphone or smart watch).

Wireless Switch

By way of example, further details for implementing the retrofit wireless switch 14 are now discussed.

Wall switches that intrinsically offer wireless connection to a lighting system exist in the market. However there are several significant drawbacks to the purchase and installation of these wireless wall switches. Consumers desire that the wireless wall switch matches the style of the other (legacy) wall switches 12 and sockets, but they may not be available on the market. Additional disadvantage is the high cost of purchase of the wireless wall switch and the effort and high cost involved in installation (by a professional installer). Also the consumer may prefer to buy a wireless switch from the connected system manufacturer instead of from the wiring accessories manufacturer since in such connected systems the functionality typically involves overtime, which is supported by software updates from the connected systems manufacturer. The wired accessories manufacturer may not be as advanced or up to date in the system configuration.

The legacy wall switch 12 can connect and disconnect the mains voltage (or other power source) 6 to the luminaire 4a. This can turn on and off the light emitted by the luminaire 4a that is connected to the wall switch 12. However in case the mains is not connected, the luminaire 4a cannot be controlled wirelessly (e.g. through an app or remote), since the lamp(s) 28 is/are not powered. Another disadvantage is that grouping features (e.g. lamps grouped per room or support for commands such as 'all lamps off') that are common in connected systems are not possible by legacy wall switches since they can only switch the mains on or off, to the respective luminaire 4a or luminaires that are connected through the mains wire installation.

Accordingly, it is desirable to provide a wireless switch 14 that can be attached to the front of an existing legacy wall switch 12, preferably while matching its style, size, shape. The wireless switch 14 maybe flexible in shape, and in embodiments made of transparent material. A single configuration can attach to various surface types, surface shapes, surface roughness or smoothness levels, and surface materials. Preferably, the wired switch 14 is designed to simplify as much as possible the installation process such that non-skilled users can obtain wireless functionality with minimum impact on aesthetics or way of using switches.

In embodiments, there is provided a thin, small and flexible battery powered wireless switch 14 that can be attached to the front of an existing wired switch 12, for example to the moving part of the switch (so-called rocker). The wireless switch 14 comprises a sensor of some sort, for example a touch sensitive sensor which upon touch will trigger actions which wirelessly switch on or off the illumination from a luminaire 4a, which would normally be the action performed by a wired switch 12.

Preferably, the thickness is such that it does not extend the total dimensions of the switch beyond what would be acceptable for the user from an aesthetic and/or functional point of view (e.g. the thickness may be in the range of 0.5 to 3 mm and the height 10 to 30 mm and length 10 to 30 mm).

There may be several covers available, matching various sizes, styles and colours. The consumer will pick the cover matching the style of the wired switch and combine the module and the cover and attach this assembly to the rocker or toggle switch of the legacy wall switch.

The battery life may be sufficient for several years of operation, and the battery may replaceable or not. For instance the battery life of the switch may be such that battery replacement may not be necessary for many years, removing the need the bulky and costly battery compartment features (e.g. battery door, spring).

The wireless switch 14 may be in one part or consist of a separate active module with the electronics and battery and antenna and a passive cover or sleeve. The method of attachment to the legacy wall switch 12 maybe by double-sided tape, or glue, or mechanical locking (clicking, screwing, etc.). E.g. the wireless wall switch 14 may comprise a "glueing" element, so as to limit the amount of components/materials needed.

The wireless system maybe ZigBee, Wi-Fi, Bluetooth, DECT, Thread, or any other.

The wireless switch 14 may contain no button, one button or more buttons.

The switch may contain any one or more of various sensors (touch, temperature, movement, acceleration, proximity, etc.).

For instance, in embodiments an integrated accelerometer may detect movement or position of the rocker and send a message to the controller. An accelerometer can also act as a position sensor for rotary switches.

The wireless switch cover may be made of plastic (e.g. injection molded or 3D printed), carton (paper), or metal (e.g. injection molded or milled). There may be a window for the RF signal near the antenna in the metal part or not.

In the case of retrofitting to a rocker switch, the wireless switch 14 may be designed in a shape such that it may replace the rocker part of an existing switch 12, or the wireless switch 14 may be attached to the front or to the inside (back) of rocker part of an existing switch 12. An additional advantage of attaching the wireless switch 14 to the front is that the antenna is farther away from the wired switch internals which may attenuate the radio signals.

The sketches of FIGS. 5 to 9 illustrate some examples of a wireless switch 14 and how it may be attached to a wired switch.

Figure 5:
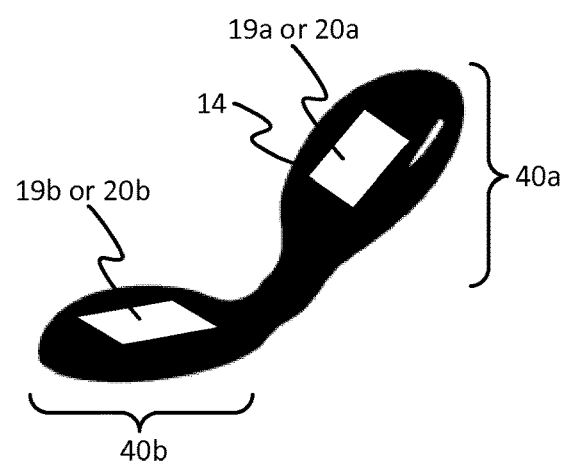
FIG. 5 is a sketch of a retrofittable wireless switch.

FIG. 5 illustrates an example comprising two separate active modules 19 (labelled here 19*a* and 19*b*), each with its own touch sensor 20, radio & antenna 24, and battery 25, and each configured as discussed in relation to FIG. 3. The sensor(s) 20 in each module 19*a*, 19*b* may alternatively or additionally comprise one or more other type of sensor such as an accelerometer, a temperature sensors, a vibration sensor and/or a proximity sensor.

In this example, the switch is considered to comprise two sub-parts: a first subpart 40*a* that is pressed when the user switches the circuit 18 from ON and OFF, and a second subpart 40*b* that is pressed when the user switches the circuit 18 from OFF to ON (or vice versa). A first one of the sensor modules 19*a* onto an external surface of the first subpart 40*a* and a second one of the sensor modules 19*b* fits onto an external surface of the second subpart 40*b*. When the first subpart 40*a* is pressed, the first module 19*a* emits a wireless signal, and when the second subpart is pressed the second module 19*b* emits a wireless signal. A variant of this is to include separate sensors 20*a*, 20*b* on each of the first and second subparts 40*a*, 40*b* respectively, but use a shared transmitter 24 and logic 22.

The signals emitted when the two subparts 40*a*, 40*b* are pressed may differ from one another so that the controller 8, 16 receiving them can distinguish between the two events. Alternatively the signals may be the same, such that the signals only indicate when the switch is pressed but not which side and the controller 8, 16 simply switches the state of the wirelessly controllable appliance 4*a* from the current state to the other state (e.g. from ON to OFF, or from OFF to ON) by keeping track of the current state, or by sending a 'switch state' command causing the wirelessly controllable appliance 4*a* to switch state, or by determining the state of the wirelessly controllable appliance 4*a* and then sending the appropriate command.

In another variant, the wireless switch 14 may only comprise one sensor module 19 comprising only one sensor 20, e.g. an accelerometer. In this case when the wired switch 12 is pressed, this is detected from the accelerometer 20 by the wireless switch's on-board logic 22, which in turn causes a signal to be emitted from the transmitter 24. This signal may just indicate the mere fact that the switch 12 has been pressed, or may also indicate the direction of the detected acceleration so that the controller 8, 16 receiving the signals can distinguish between the switch 12 being pressed in opposite directions.

Figure 6:
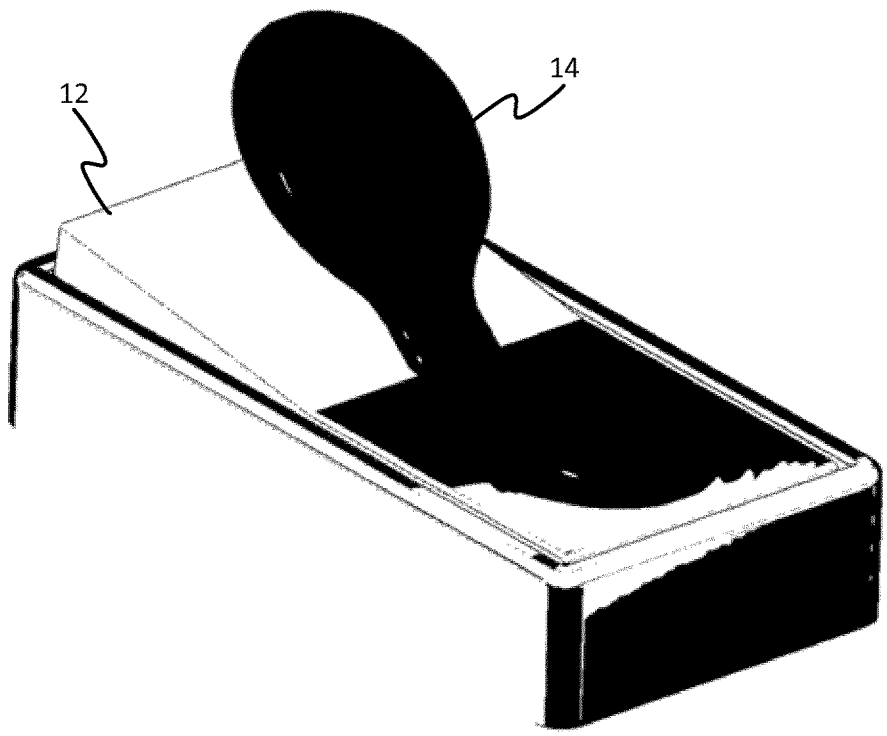
FIG. 6 is a sketch of a wireless switch retrofitted onto a wired rocker switch.
Figure 7:
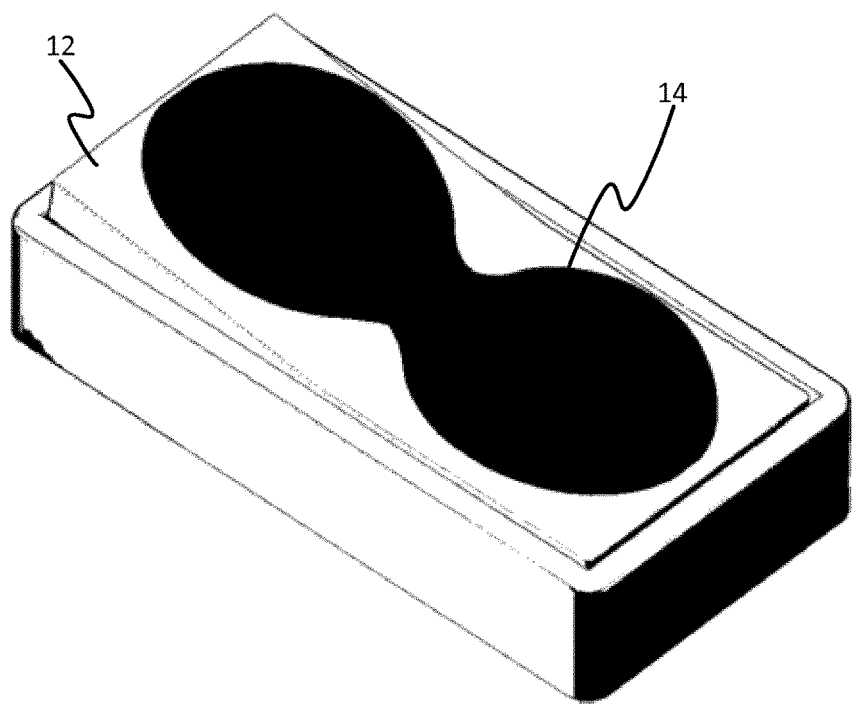
FIG. 7 is another sketch of a wireless switch retrofitted onto a wired rocker switch.

FIGS. 6 and 7 illustrate how the wireless switch 14 of FIG. 5 may be fitted to the front surface of the rocker of a legacy rocker switch 12.

Figure 8:
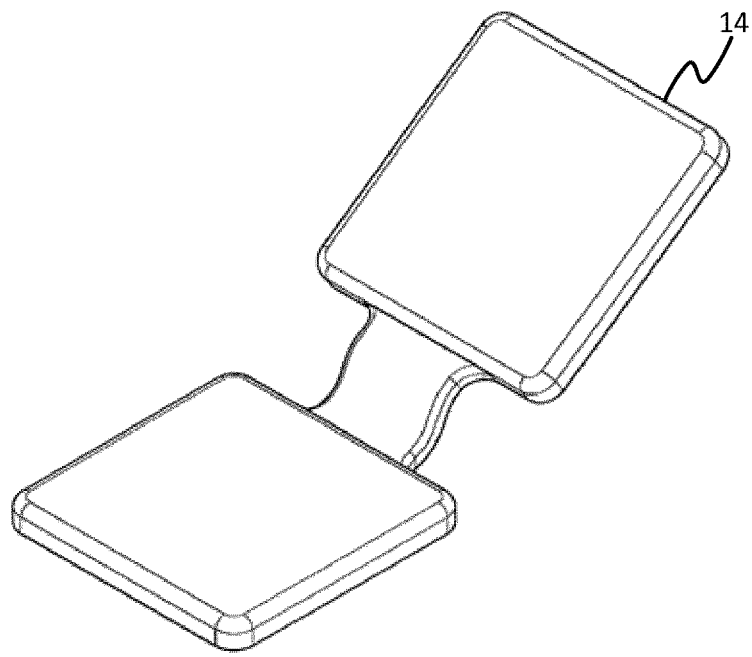
FIG. 8 is another sketch of a wireless switch retrofitted onto a wired rocker switch.
Figure 9:
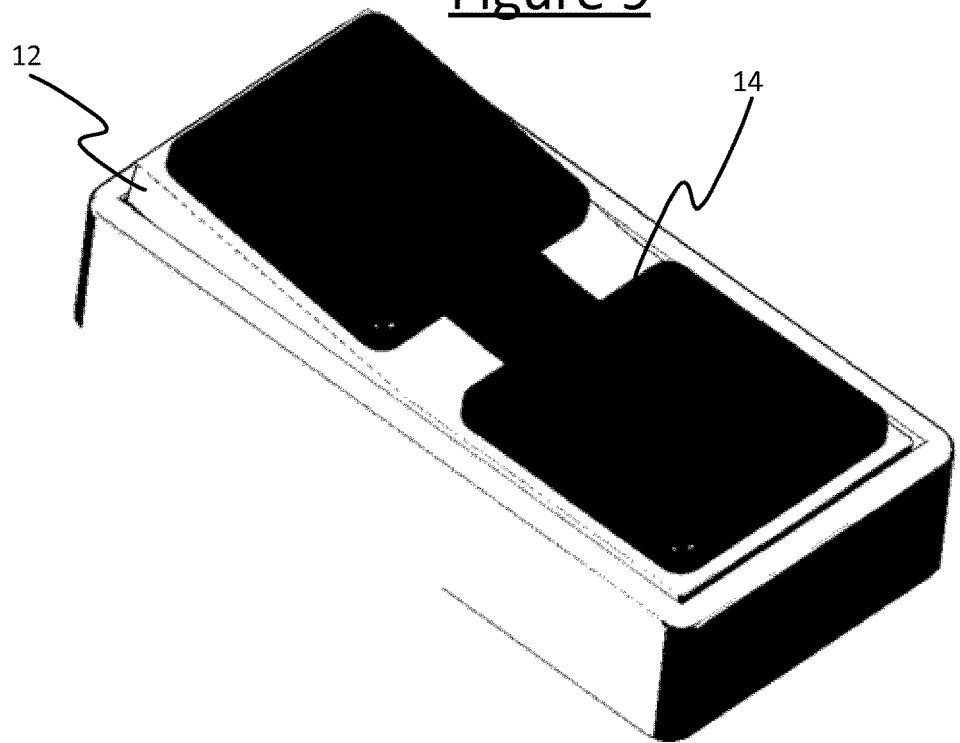
FIG. 9 is another sketch of a wireless switch retrofitted onto a wired rocker switch.

FIGS. 8 and 9 illustrate another variant of the design of FIGS. 5 to 7.

A wireless switch 14 with such a design may for example enable the system to sense whether the wired switch 12 is being touched, and/or to sense the position of a rocker switch so the system can know whether a light is powered or not. Variants may also sense the movement of a dimmer wheel, toggle action, or slider functionality.

Applications

There are a variety of possible uses for knowing the state of the wired switch 12 at the controller, such as the smart phone running an app 8 or the bridge 16.

For instance, the smart phone running an app 8 may be configured to adapt the user interface 38 to reflect the status of the switch. E.g. where a luminaire 4*a* is switched by a wired switch 12, then one or more on-screen controls for controlling that luminaire 4*a* may be greyed-out, or a warning message may be displayed, or such like, to indicate that the user 10 has no control over that luminaire 4*a*. And/or, the on-screen control(s) for that luminaire 4*a* may be blocked from being used by the user 10 (e.g. a slider or dial does not respond when the user attempts to drag it up and down or round and round). And/or, along similar lines, if a user 10 attempts to control a luminaire 4*a*, the controller 8, 16 may select not to send a lighting control command in response to this when it knows that the luminaire 4*a* is not available.

As another example, if the wired switch 12 is initially in the ON state, but is then turned to the OFF state, then the controller 8, 16 of the smart phone running an app 8 may control another of the luminaires 4*b* to flash in order to warn the user.

In yet another example, if the controller 8, 16 is controlling a plurality of luminaires 4 to render a lighting scene (as discussed above), and then the controller 8, 16 receives a signal from a wireless switch 14 indicating that the wired switch 12 powering one of those luminaires 4*a* has been turned off, the controller 8, 16 may adapt the illumination from the remaining luminaires 4*a* in order to compensate for the missing luminaire. That is, the controller 8, 16 adapts the illumination from the remaining luminaires 4 to render an adapted scene that is as close an approximation as possible to the previous scene (that included the now-missing luminaire 4*a*). Compensating for the missing luminaire 4*a* may be done by setting the other luminaires 4*b*-*d* in the scene (not missing) to a higher brightness level and/or different color, with the aim of maintaining approximately a certain target amount of light in the room as defined by the scene, and/or an approximation of the same color distribution as defined by the scene. When the controller 8, 16 receives another signal from the wireless luminaire 4*a* indicating that power has been restored to the missing luminaire 4*a*, the controller 8, 16 reverts to rendering the previous scene including that luminaire 4*a*.

There are a number of possible ways to determine how the color and/or brightness levels of the illumination emitted from the remaining luminaires 4*b*-*d* should be adapted in order to compensate for the missing luminaire 4*a*. For instance, in embodiments a compensating scene for compensating for a missing luminaire 4*a* may be predesigned and stored in a memory of the controller 8, 16. For instance if the scene settings of the main (uncompensated) scene are programmed into the system from the time of commissioning, then compensating this could be determined by a commissioning technician at the commissioned at the commissioning stage, or else the compensating scene could be predesigned by a user at a later stage. E.g. the compensated scene could be predesigned by using a mathematical model of the emitted illumination and optionally the environment to predict the overall illumination when the first luminaire 4a is missing and when not. Or the compensated scene could be predesigned based on taking empirical measurements from light meters at different positions in the environment 2 in order to try to achieve measurements best approximating the main scene, or simply by the technician or user gauging the compensated scene by eye. Alternatively a predesigned compensation scene need not be pre-programmed. Instead the control equipment 8 may comprise a mathematical model of the emitted illumination and optionally also of the environment 3, and may use this model to dynamically determine the adaptation to apply to the color and/or brightness emitted by the remaining luminaires 4b-d. The model could be purely analytical, or could be commissioned at the commissioning stage. E.g. the commissioning technician takes a number of readings from a light meter at a set of different positions within the environment, a under a range of different scene settings, and uses these to build up a dataset defining an empirical model for predicting the effects of removing one luminaire 4a and adapting the illumination from others 4b-4d.

In further applications of the wireless switch generally, this may be used to support grouping features, and/or time or situation aware functionality.

Grouping is a feature that groups certain lamps or luminaires in a lighting system with wireless control, such that through one remote control multiple lamps can be controlled with the same control command, e.g. to dim down/up, or to set a certain light color. By using a wireless switch 14 retrofitted to the wired switch 12 controlling one of the luminaires 4a, this allows the luminaire 4a to be grouped together by the control equipment 8 with one or more other luminaires 4b, 4c, 4d despite those other luminaires not being powered by the same power circuit 18 or behind the same wired switch 12 as the first luminaire 4a. The control equipment 8 can then control the first luminaire 4a and other luminaires 4a, 4c, 4d together as a group. E.g. the user 10 inputs operates a single control in the user interface (e.g. single on/off button or single dimmer control) and in response the same operations applied by the controller to all the luminaires 4a-d of the group.

Situation and/or time aware functionality relates to functionality whereby the controller 8, 16 is configured to be maintain an awareness of additional information such as the time (e.g. via an internet connection) and/or the state of one, more or all of the other luminaires 4 or lamps in the system (which on, which off, what color, what dim level). For example, though a set of predetermined rules, the controller 8, 16 may be configured to connect different behavior to the switch control depending on the time. E.g. during the evening a press of the wireless switch 14 can trigger normal light level of the luminaire 4a, while in the middle of the night it may trigger dimmed level of the same luminaire 4a (to prevent waking up too much when one needs to go to the bathroom). As another example, when the wireless switch 14 is pressed, the response of the corresponding luminaire 4a may depend on the current state of one or more others of the luminaires 4b-d.

In another yet another alternative or additional application, the retrofittable wireless switch 14 may be used to anticipate the user's intentions. Particularly useful here is the case where the sensor 20 in the retrofittable wireless switch 14 works based on proximity instead of touch, but the following can also be implemented based on touch sensor, or indeed other types of sensor such as a vibration sensor or temperature sensor (which senses the temperature from a user's body).

The idea here is that the controller 8, 16 can be configured, based on the signals from the sensor(s) 20 in the wireless switch 14, to anticipate that the user is about to press the wired switch, then switch the lights on or off before the user actually does press the wired switch. The power is then not in fact turned on or off, because the lights are switched on or off wirelessly before the user has chance to cause the wired switch to turn the power on or off. Seeing the lights have already turned on or off, the user instinctively pulls away from pressing the switch 12 before actually pressing it or at least before fully pressing it (or more generally before it is actually mechanically actuated so as to break the electrical circuit 18).

The above may be beneficial for example in the following scenario. In some systems, it may be possible that the wired switch 12 is in the ON position (the luminaire 4a is powered), but the luminaire 4a is in a standby state (no light is emitted). Without further measures being implemented, a user noticing that there is no light cannot distinguish between the two, so he or she may try to switch the wired switch from ON to OFF, hoping there will be light. Using a touch or proximity-based switch 14 on the other hand, the user's attempt to switch the wired switch 12 can be detected, and the lamp can actually be woken up from standby by a wireless control signal before the user exerts enough mechanical force for the wired switch 12 to switch (which would result in cutting the power from the lamp, meaning no light could be emitted). Thus as the user tries to turn the luminaire 4a ON, he or she would see the light turn on before (s)he gets a chance to push the wired switch 12 to the OFF position. With the wired switch 12 in the off position, the luminaire 4a would not turn on until the user actually moved the wired switch 12 to the on position.

The wired switch 12 changing states (e.g. ON→OFF) leads to the networked luminaire 4a changing states (i.e. powered on→powered off), which also applies to the network interface 32 of the luminaire 4a (i.e. lamp node goes from online→offline). This availability change can trigger mapping (initializing) the wired switch areas to the ON and/or OFF command for controlling the wirelessly controllable appliance. When the add-on switch 14 moves from up→down and it is detected that the networked luminaire 4a subsequently goes offline in the network, then the conclusion is drawn that the 'down' position of the wired switch corresponds to the desire of the user of turning a lamp off. Assume now that the wireless switch 14 placed on the wired switch 12 covers both 'sides' 40a, 40b of the wired switch. When the wired switch 12 is back in the ON position (i.e. the networked luminaire 4a is powered and available online), then when the user approaches with his/her finger the 'down' part of the wired switch 12 (and therefore a related part of the wireless switch 14) the system can turn the networked luminaire 4a off (or rather, turns off the lamp 28 without turning off the wireless communications capability of the luminaries 4a). The light then turns off as the user desired, but also this can be done before the user has the chance to push the wireless switch 14 (on the surface of the wired switch 12) hard enough to make the wired switch 12 move to its OFF position—i.e. the wired switch 12 remains in the ON position, yet the lamp 28 of the networked luminaire 4a is turned off via controlling it to do so through its network interface.

The wired switch 12 changing its position (as sensed by the wireless switch 14 retrofitted to it) and/or the luminaire 4a joining or leaving the network can trigger the initialization. For instance, in a first embodiment, detecting a change in position of the wired switch 12 triggers linking the new position of wireless switch 14 to the network status of the luminaire 4a (if the luminaire 4a is online, the position of wired switch 12=ON; if the luminaire 4a is offline, position of wireless switch=OFF). Or in a second embodiment detecting a change in the network status of the luminaire 4a triggers the position of wired switch 12 to be linked to the new network status of the luminaire 4a. Or in a third embodiment, (preferred as this prevents a mismatch), the initialization is only triggered when both are detected; i.e. when a change in position of the wired switch 12 is detected and a change in the network status of the luminaire 4a is detected.

The initialization causes each of the e.g. UP and DOWN parts 40a, 40b of the wireless switch 14 to be associated with either one of an ON/OFF command respectively, such that the operation paradigm of the wireless switch 14 matches the operation of the wired switch. As such, after initialization a user touching the part of the wireless switch 14 stuck to the part of the wired switch 12 that when pressed would normally cause the luminaire 4a to turn on will result in an ON command being sent to the luminaire 4a and vice versa. Thus the part of the wired switch that the user would touch to turn a luminaire 4a ON without the retrofitted wireless switch 14 is the same part (s)he touches when the wireless switch 14 has been retrofitted.

In some scenarios, initialization need only occur once. However, optionally there is re-initialization every time there is a trigger, such as the reachability of the wirelessly controllable appliance 4a changing. This can be selectable by the user, for example if multiple wired switches control the same appliance (e.g. a changeover switch).

Preferably the user need not change the position of the wired switch 12, i.e. it should remain in the ON position. By detecting proximity of a finger or by detecting a light touch as opposed to a proper press, or the like, the user can touch the OFF part of the wireless switch 14 without pressing it too hard/far that it actually causes the wired switch 12 to go to the OFF position. In real life the user might press too hard/far when the system is slow, causing the undesirable situation that the wired switch 12 is in the OFF position and the luminaire 4a can no longer be wirelessly be controlled. The wireless switch 14 would detect the user's finger approaching (or lightly touching, etc.) and can already send the signal that causes the lamp 28 to turn off such that the response time decreases. This in turn decreases the chance of the user pressing too hard/far as the user would stop the pressing action the moment the lamp 28 turns off.

CONCLUSION

It will be appreciated that the above embodiments have been described only by way of example.

For instance, the applicability of the techniques disclosed herein is not limited to any of the particular type of wired switch 12, and more generally a wireless switch 14 can be designed to fit to a wide variety of legacy wall switches. These can vary in shape, size, color, material finish, functionality, or number of buttons, etc. Also, the wired switch does not necessarily have to be wall switch, and could instead for example be a switch mounted in an item of furniture, a cabinet, a junction box, a ceiling, or a lampstand, etc. Further, the wired switch 12 need not necessarily be arranged to switch the power to a luminaire 4a, and may instead be arranged to switch the power to other types of appliance such as those for providing another utility into an environment, e.g. an air conditioning unit, or a heater, etc. The techniques disclosed herein can apply to various fields of application such as connected lighting systems (residential, commercial), or other wireless connected systems, like home automation systems or security systems, in which there is a benefit of using wall based triggers (location next to the door, logical positioning when entering a room) and there is a hurdle to replace existing (legacy) wall based controls (availability, cost of purchase, effort of installation, cost of installation, etc.).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Control equipment for use in a system, the system comprising:
   a wirelessly controllable appliance, and
   a wired switch connected into a wired electrical circuit for supplying power from a power source to the wirelessly controllable appliance, the wired switch arranged to be switched from a first position to a second position by a user exerting mechanical force on a first area of the wired switch, and from the second position to the first position by the user exerting mechanical force on a second area of the wired switch,
   wherein one of the first position and the second position of the wired switch is an ON state in which the power is supplied from the power source to the wirelessly controllable appliance via the electrical circuit, and the other of the first position and the second position of the wired switch is an OFF state in which no power is supplied to the wirelessly controllable appliance via the electrical circuit;
   the control equipment comprising:
   a wireless switch arranged to be retrofitted to the wired switch, the wireless switch comprising one or more sensors, the one or more sensors arranged to detect whether the wired switch is in the first position or the second position and the one or more sensors further arranged to detect a touch input in at least a part of the first area of the wired switch and the one or more sensors further arranged to detect a touch input in at least a part of the second area of the wired switch, the wireless switch further comprising transmission circuitry arranged to transmit an indication of said detections, and a controller arranged to wirelessly control the wirelessly controllable appliance via a wireless communication channel, to receive the indication, and to determine a reachability of the wirelessly controllable appliance over the wireless communication channel, wherein the controller is further arranged to associate, based on the determined reachability of the wirelessly controllable appliance, one of the first area and the second area to an OFF command for turning OFF the wirelessly controllable appliance, such that the one area of the first area is the same area as the one of the second area which, when pressure is exerted on it, causes the wired switch to be switched to the position of the first and second position associated with the OFF state, and wherein the controller is further arranged for controlling the wirelessly controllable appliance, at least when the wired switch is in the ON state, to turn OFF when an indication is received of detection of a touch input in at least a part of the one of the first area and the second area associated with the OFF command.

2. The control equipment of claim 1, wherein the controller is further arranged to associate the other of the first area and the second area to an ON command for turning ON the wirelessly controllable appliance, and wherein the controller is further arranged for controlling the wirelessly controllable appliance, at least when the wired switch is in the ON state, to turn ON when an indication is received of detection of a touch input in at least a part of the other one of the first area and the second area associated with the ON command.

3. The control equipment of claim 2, wherein the wirelessly controllable appliance comprised in the system is a lighting device arranged to emit illumination to illuminate an environment, and wherein the controller is arranged to control the lighting device when the lighting device is powered by the power source.

4. The control equipment of claim 3, wherein the controller is further arranged to control one or more of:
   a degree of intensity of the light emitted by the lighting device,
   a color of the light emitted by the lighting device, and
   a lighting scene according to which the lighting device emits light.

5. The control equipment of claim 1, wherein the controller is further arranged to control one or more other wirelessly controllable appliances based on receiving an indication of detection of a touch input.

6. The control equipment of claim 1, wherein the controller is arranged to associate the one of the first area and the second area to an OFF command when it has received an indication of a detection of the wired switch changing from the first position to the second position or from the second position to the first position.

7. The control equipment of claim 1, wherein the controller is arranged to associate the one of the first area and the second area to an OFF command when it has determined a change in the reachability of the wirelessly controllable appliance over the wireless communication channel.

8. The control equipment of claim 1, wherein the controller is arranged to associate the one of the first area and the second area to an OFF command only when it has both determined a change in the reachability of the wirelessly controllable appliance over the wireless communication channel, and it has received an indication of a detection of the wired switch changing from the first position to the second position or from the second position to the first position.

9. The control equipment of claim 1, wherein the one or more sensors of the wireless switch comprise one or more of: an accelerometer, a touch sensor, a proximity sensor, and/or a vibration sensor.

10. The control equipment of claim 9, wherein the wireless switch comprises a first part for at least partially overlapping the first area of the wired switch and a second part for at least partially overlapping the second area of the wireless switch, and wherein each of the first and the second part comprises a sensor for detecting a touch input.

11. The control equipment of claim 10, wherein the sensor for detecting the touch input is a sensor for detecting a bodily object within a proximity of the sensor, and wherein the touch input is a near touch input.

12. A system comprising the control equipment of claim 1, and the wired switch and/or the wirelessly controllable appliance.

13. A method of controlling a wirelessly controllable appliance through a controller comprised in a system, the system further comprising a wired switch retrofitted with a wireless switch, the wired switch connected into a wired electrical circuit for supplying power from a power source to the wirelessly controllable appliance, the wired switch arranged to be switched from a first position to a second position by a user exerting mechanical force on a first area of the wired switch, and from the second position to the first position by the user exerting mechanical force on a second area of the wired switch, wherein one of the first position and the second position of the wired switch is an ON state in which the power is supplied from the power source to the wirelessly controllable appliance via the electrical circuit, and the other of the first position and the second position of the wired switch is an OFF state in which no power is supplied to the wirelessly controllable appliance via the electrical circuit;

the method comprising: receiving, from the wireless switch, an indication whether the wired switch is in the first position or the second position, the controller further receiving, from the wireless switch, an indication of detection of a touch input in at least a part of the first area of the wired switch or an indication of detection of a touch input in at least a part of the second area of the wired switch, determining a reachability of the wirelessly controllable appliance over a wireless communication channel, associating, based on the determined reachability of the wirelessly controllable appliance, one of the first area and the second area to an OFF command for turning OFF the wirelessly controllable appliance, such that the one area of the first area is the same area as the one of the second area which, when pressure is exerted on it, causes the wired switch to be switched to the position of the first and second position associated with the OFF state, and controlling the wirelessly controllable appliance, at least when the wired switch is in the ON state, to turn OFF when an indication is received of detection of a touch input in at least a part of the one of the first area and the second area associated with the OFF command.

14. The method according to claim 13, wherein the method further comprises:
   associating the other one of the first area and the second area to an ON command for turning ON the wirelessly controllable appliance, and controlling the wirelessly controllable appliance, at least when the wired switch is in the ON state, to turn ON when an indication is received of detection of a touch input in at least a part of the other one of the first area and the second area associated with the ON command.

15. A computer program product arranged for performing the method according to claim 13 when run on a computer device.

\* \* \* \* \*